(12) United States Patent
Brandl et al.

(10) Patent No.: US 8,038,214 B2
(45) Date of Patent: Oct. 18, 2011

(54) HARNESS SYSTEM FOR JUVENILE VEHICLE SEAT

(75) Inventors: Curtis J. Brandl, Fishers, IN (US); Todd C. Midkiff, Noblesville, IN (US)

(73) Assignee: Cosco Management, Inc., Wilmington, DE (US)

( * ) Notice: Subject to any disclaimer, the term of this patent is extended or adjusted under 35 U.S.C. 154(b) by 151 days.

(21) Appl. No.: 12/369,493

(22) Filed: Feb. 11, 2009

(65) Prior Publication Data

US 2010/0201170 A1 Aug. 12, 2010

(51) Int. Cl.
*A47D 1/10* (2006.01)
*A47D 15/00* (2006.01)
(52) U.S. Cl. ............... 297/250.1; 297/484; 297/485
(58) Field of Classification Search ......... 297/464, 297/250.1, 188.13, 468, 484, 483, 486, 485
See application file for complete search history.

(56) References Cited

U.S. PATENT DOCUMENTS

| | | | |
|---|---|---|---|
| 3,079,679 A * | 3/1963 | Tullis | 29/235 |
| 3,794,135 A * | 2/1974 | Ewert et al. | 280/802 |
| 3,799,577 A | 3/1974 | Colucci | |
| 4,192,530 A | 3/1980 | Cachia | |
| 4,288,097 A | 9/1981 | Ueda | |
| 4,376,551 A | 3/1983 | Cone | |
| 4,431,233 A | 2/1984 | Ernst | |
| 4,662,683 A | 5/1987 | Knoedler et al. | |
| 4,738,489 A | 4/1988 | Wise et al. | |
| 5,061,012 A | 10/1991 | Parker et al. | |
| 5,286,091 A * | 2/1994 | Busch | 297/487 |
| 5,709,408 A | 1/1998 | Carraway, Jr. | |
| 5,716,097 A | 2/1998 | Peck et al. | |
| 5,979,983 A | 11/1999 | Gallbreath | |
| 6,893,088 B2 | 5/2005 | Kassai et al. | |
| 7,445,286 B2 | 11/2008 | Siewertsen et al. | |
| 2001/0025400 A1 | 10/2001 | Romca et al. | |
| 2002/0070593 A1 | 6/2002 | Takayama | |
| 2004/0004377 A1* | 1/2004 | Baloga et al. | 297/217.1 |
| 2005/0179289 A1 | 8/2005 | Fuller et al. | |
| 2008/0136234 A1 | 6/2008 | Hutchinson et al. | |
| 2008/0157576 A1 | 7/2008 | Chen et al. | |

FOREIGN PATENT DOCUMENTS

EP 1 623 981 2/2006
JP 2009-6913 1/2009

* cited by examiner

*Primary Examiner* — Milton Nelson, Jr.
(74) *Attorney, Agent, or Firm* — Barnes & Thornburg LLP

(57) ABSTRACT

A child restraint having a juvenile vehicle seat, a harness for securing a juvenile to the juvenile vehicle seat, and a harness-positioning system for positioning the harness in an open juvenile-receiving position.

4 Claims, 11 Drawing Sheets

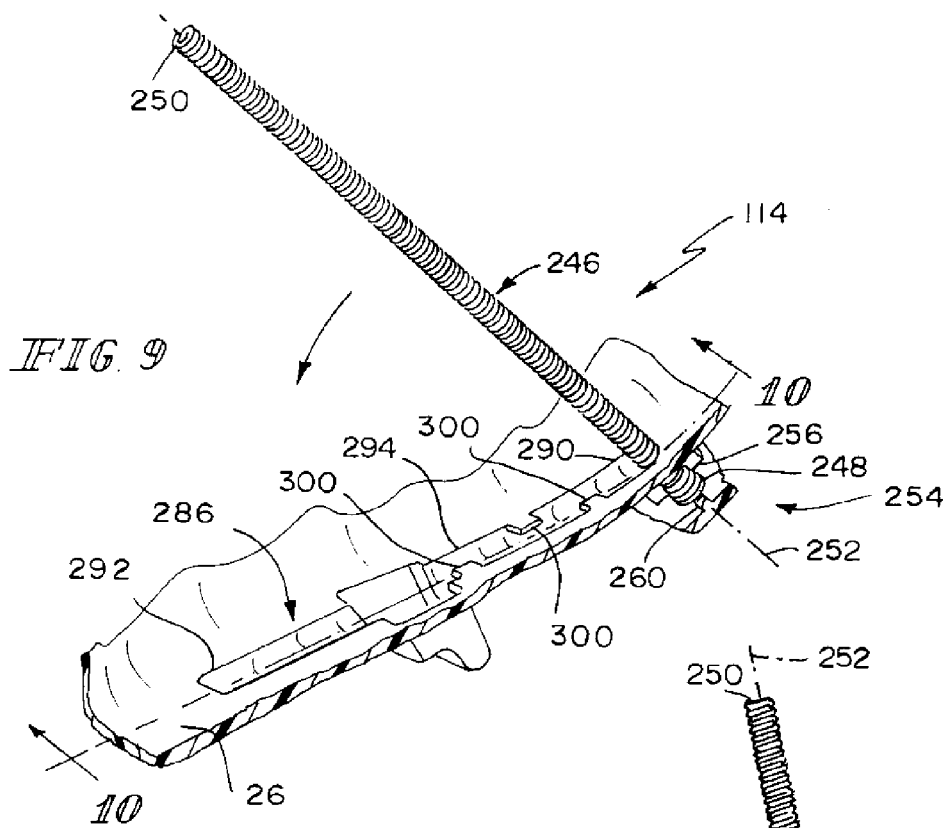
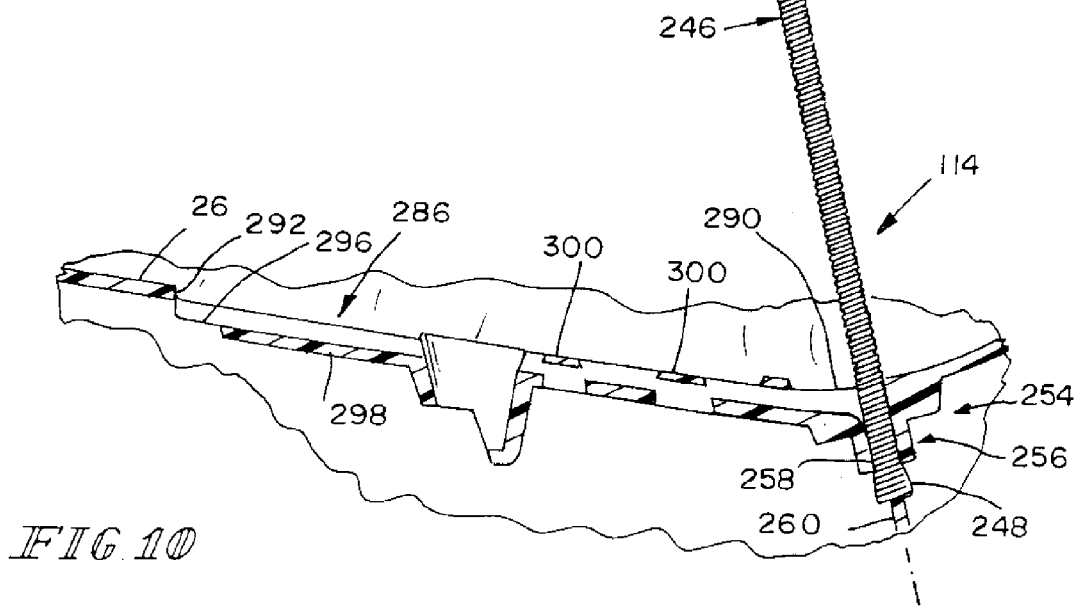

HARNESS SYSTEM FOR JUVENILE VEHICLE SEAT

BACKGROUND

The present disclosure relates to child restraints, and particularly to a harness system for securing a juvenile to a juvenile vehicle seat of a child restraint. More particularly, the present disclosure relates to a harness-positioning system for positioning a harness in an open juvenile-receiving position for the receipt of a juvenile in a juvenile vehicle seat.

SUMMARY

According to the present disclosure, a child restraint includes a juvenile vehicle seat adapted to receive a juvenile, a harness for securing the juvenile to the juvenile vehicle seat, and a harness-positioning system for positioning the harness in an open juvenile receiving position when the harness is in an unlocked condition.

In the illustrative embodiments, the harness includes a first shoulder belt, a second shoulder belt, a first lap belt and a second lap belt. The harness-positioning system includes a first positioner coupled to the first shoulder belt of the harness, a second positioner coupled to the second shoulder belt of the harness, a third positioner coupled to the first lap belt of the harness, and a fourth positioner coupled to the second lap belt of the harness. Each positioner includes a biasing member coupled to the juvenile vehicle seat and a coupler pad coupled to the harness. The harness, first positioner, second positioner, coupler pad of the third positioner and coupler pad of the fourth positioner can be removed from the juvenile vehicle seat, and the biasing members of the third and fourth positioners can be stored in storage pockets of the juvenile vehicle seat, to convert the juvenile vehicle seat from a harness-restraining condition to a vehicle seat belt-restraining condition.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 9 is a partial perspective view of the seat bottom of the juvenile vehicle seat taken along line 9-9 of FIG. 3 showing the biasing member of the third positioner in the open juvenile-receiving position, a storage pocket in the seat bottom having a top opening and detent members for retaining the biasing member in a stored position within the storage pocket, and suggesting that the biasing member may be moved from the open juvenile-receiving position to the stored position;

FIG. 10 is a partial cross sectional view of the seat bottom of the juvenile vehicle seat taken along line 10-10 of FIG. 9. showing the proximal end of the biasing member of the third positioner coupled to the seat bottom by a mount and a stop member, and showing the detent members of the storage pocket in the seat bottom for retaining the biasing member in a stored position within the storage pocket;

DETAILED DESCRIPTION

Figure 1:
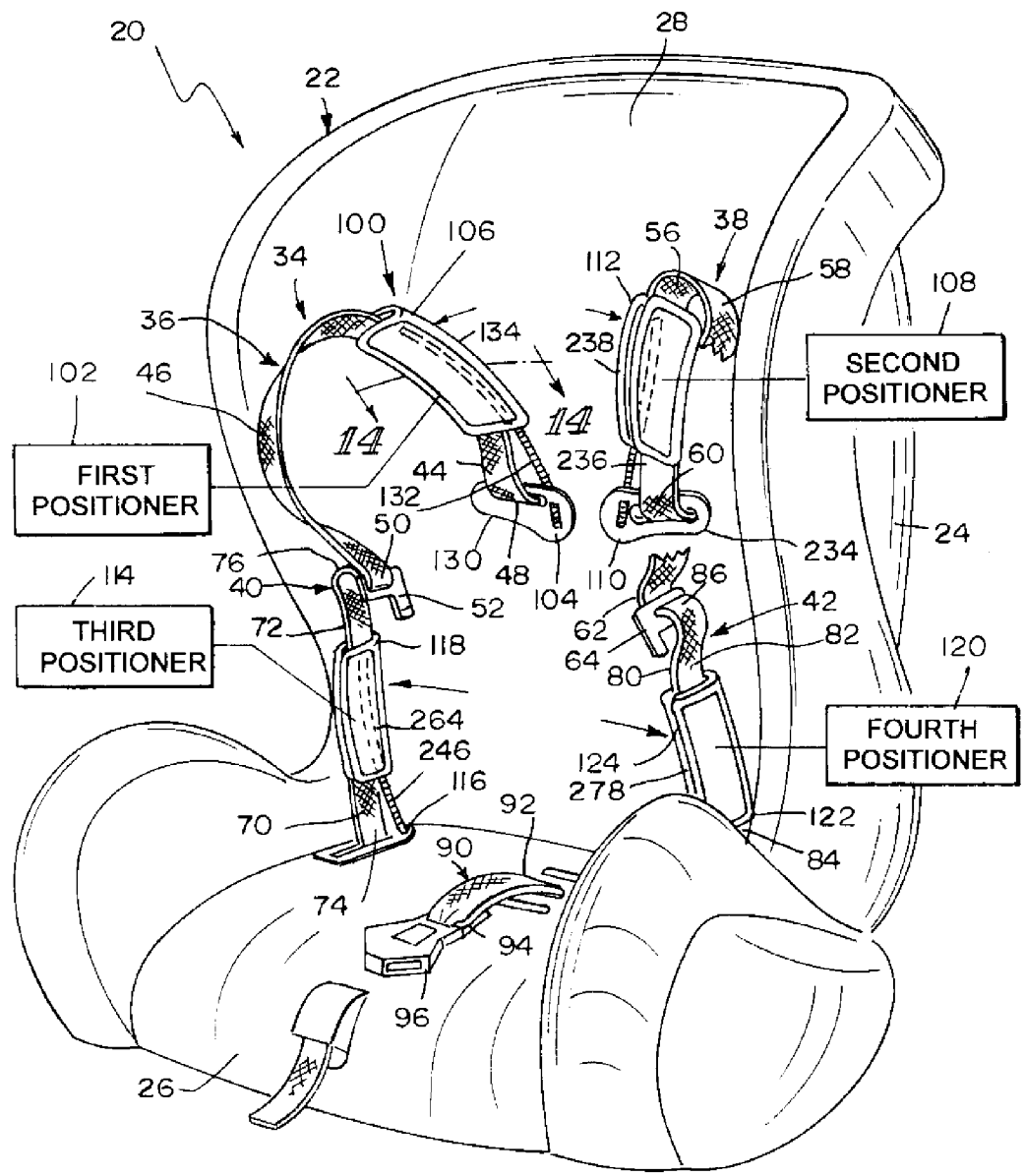
FIG. 1 is a perspective view showing an illustrative child restraint in accordance with the present disclosure wherein the child restraint includes a juvenile vehicle seat having seat back and a seat bottom, a harness shown in an unlocked condition and configured to secure a juvenile to the juvenile vehicle seat when the harness is placed in a locked condition, and a harness-positioning system comprising four positioners for positioning the harness in an open juvenile-receiving position for the receipt of a juvenile in the juvenile vehicle seat when the harness is in the unlocked condition.
Figure 2:
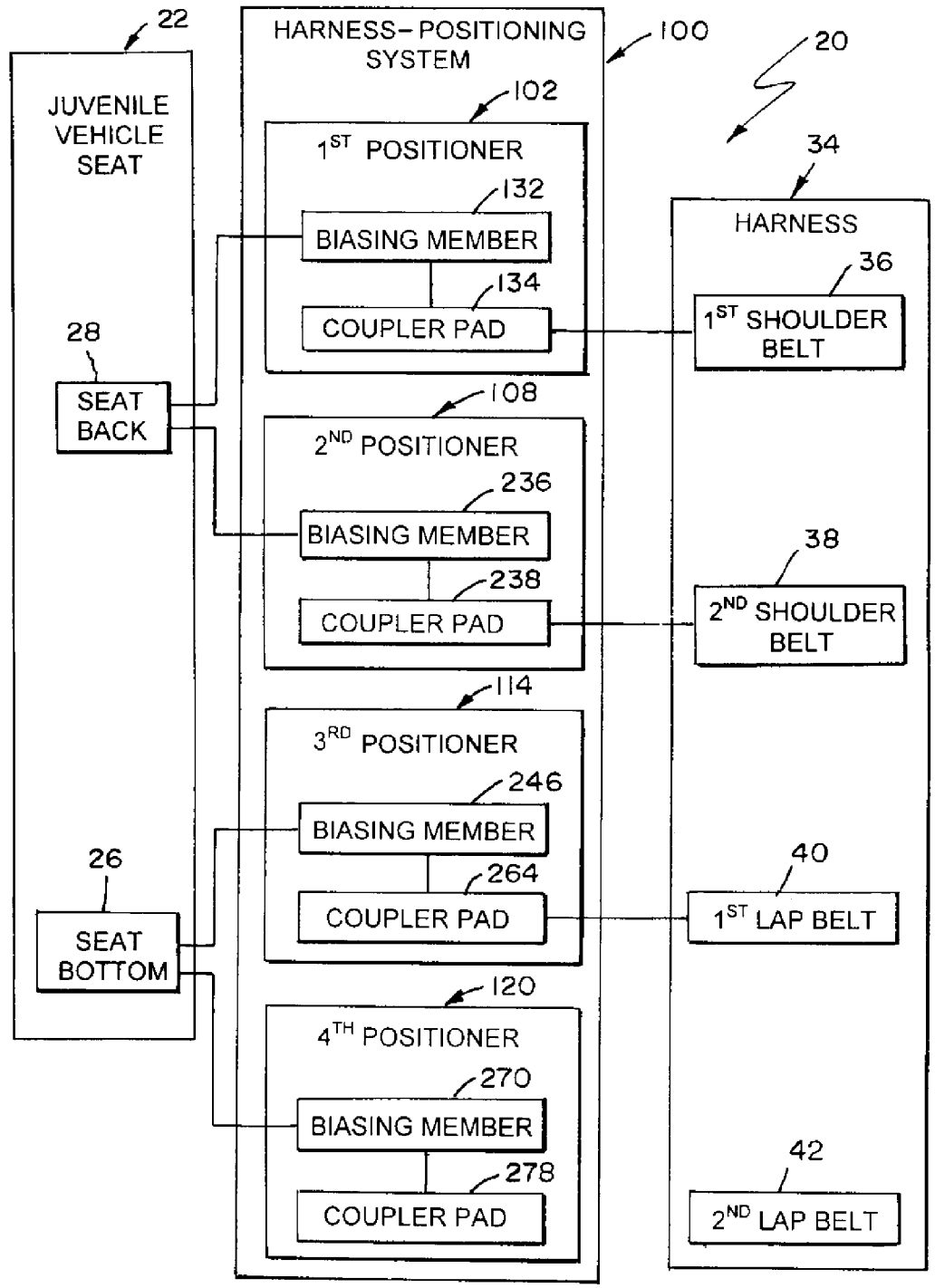
FIG. 2 is a diagrammatic view of a child restraint in accordance with the present disclosure, the child restraint including a juvenile vehicle seat having a seat back and a seat bottom, a harness including a first shoulder belt coupled to the seat back, a second shoulder belt coupled to the seat back, a first lap belt coupled to the seat bottom, and a second lap belt coupled to the seat bottom, and a harness-positioning system including a first positioner having a biasing member and a coupler pad coupled to the first shoulder belt, a second positioner having a biasing member and a coupler pad coupled to the second shoulder belt, a third positioner having a biasing member and a coupler pad coupled to the first lap belt, and a fourth positioner having a biasing member and a coupler pad coupled to the second lap belt.

A child restraint 20 is shown in FIG. 1 including a juvenile vehicle seat 22 adapted to be removably secured to a seat of a vehicle. Juvenile vehicle seat 22 includes a seat shell 24, a seat bottom 26 and a seat back 28 extending outwardly from seat bottom 26. Child restraint 20 also includes a harness 34 coupled to juvenile vehicle seat 22. Harness 34 includes a first shoulder belt 36, a second shoulder belt 38, a first lap belt 40 and a second lap belt 42.

First shoulder belt 36 of harness 34 comprises a generally flat and elongate flexible strap having an interior surface 44 and an exterior surface 46. First shoulder belt 36 extends from a proximal end 48 coupled to seat back 28 of juvenile vehicle seat 22 to a distal end 50. Distal end 50 is coupled to a first buckle 52. Second shoulder belt 38 of harness 34 comprises a generally flat and elongate flexible strap having an interior surface 56 and an exterior surface 58. Second shoulder belt 38 extends from a proximal end 60 coupled to seat back 28 of juvenile vehicle seat 22 to a distal end 62. Distal end 62 is coupled to a second buckle 64.

First lap belt 40 of harness 34 comprises a generally flat and elongate flexible strap having an interior surface 70 and an exterior surface 72. First lap belt 40 extends from a proximal end 74 coupled to seat bottom 26 of juvenile vehicle seat 22 to a distal end 76. Distal end 76 is coupled to first buckle 52. Distal end 76 of first lap belt 40 may be coupled to distal end 50 of first shoulder belt 36 such that a single strap forms first shoulder belt 36 and first lap belt 40. Second lap belt 42 of harness 34 comprises a generally flat and elongate flexible strap having an interior surface 80 and an exterior surface 82. Second lap belt 42 extends from a proximal end 84 coupled to seat bottom 26 of juvenile vehicle seat 22 to a distal end 86. Distal end 86 is coupled to second buckle 64. Distal end 86 of second lap belt 42 may be coupled to distal end 62 of second shoulder belt 38 such that a single strap forms second shoulder belt 38 and second lap belt 42.

Harness 34 also includes a crotch strap 90. Crotch strap 90 is generally flat and flexible and includes a proximal end coupled to seat bottom 26 of juvenile vehicle seat 22 and a distal end 94 coupled to a buckle lock 96. First buckle 52 and second buckle 64 are configured to be selectively connected to buckle lock 96 such that harness 34 is in a locked condition, and selectively released from buckle lock 96 such that harness 34 is in an unlocked condition.

Child restraint 20 also includes a harness-positioning system 100. Harness-positioning system 100 includes a first positioner 102 having a proximal end 104 coupled to and extending outwardly from seat back 28 and a distal end 106 coupled to first shoulder belt 36, a second positioner 108 having a proximal end 110 coupled to and extending outwardly from seat back 28 and a distal end 112 coupled to second shoulder belt 38, a third positioner 114 having a proximal end 116 coupled to and extending outwardly from seat bottom 26 and a distal end 118 coupled to first lap belt 40, and a fourth positioner 120 having a proximal end 122 coupled to and extending outwardly from seat bottom 26 and a distal end 124 coupled to second lap belt 42.

Figure 8:
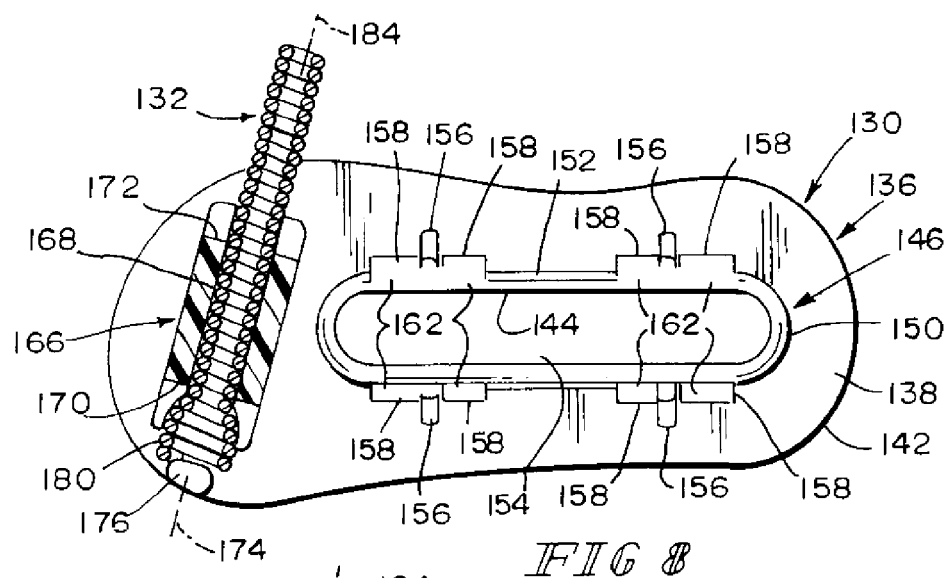
FIG. 8 is a sectional view taken along line 8-8 of FIG. 7 after the biasing member is coupled to the mounting plate showing the face plate, collar, and belt passageway of the mounting base and the proximal end of the biasing member coupled to the mount of the mounting base.
Figure 7:
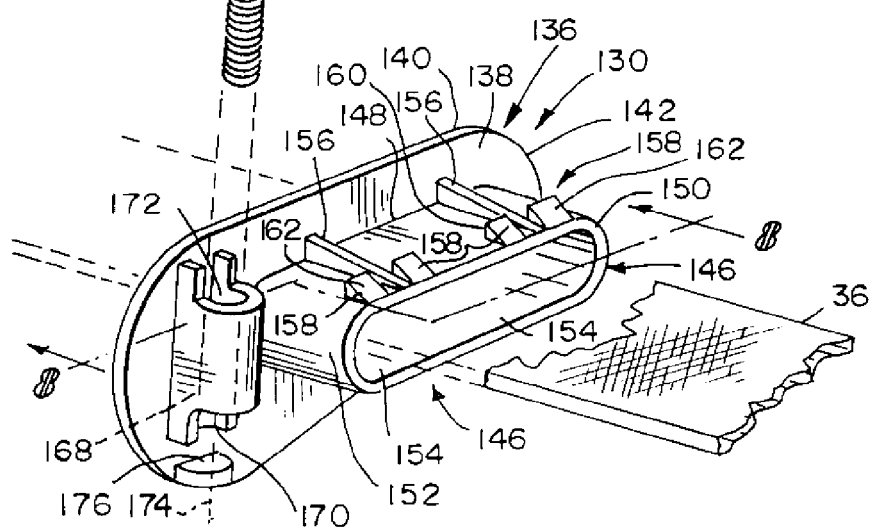
FIG. 7 is an enlarged partial rear perspective view of the mounting base of the first positioner, the mounting base having a face plate, a collar attached to the face plate, and a passageway extending through the face plate and collar for the receipt of a belt of the harness, and showing a mount and a stop member for coupling a biasing member to the mounting base.

First positioner 102 of harness-positioning system 100 includes a mounting base 130, a resiliently flexible biasing member 132 and a flexible coupler pad 134. Mounting base 130, as shown in FIGS. 7 and 8, includes a generally planar and plate-like face plate 136 having an interior face 138, an exterior face 140, a peripheral edge 142 and an opening 144 in the general form of an obround. Mounting base 130 also includes a collar 146 having a first end 148 attached to interior face 138 of face plate 136 and that extends from interior face 138 to a second end 150. Collar 146 includes a peripheral side wall 152 in the general shape of an obround. A passageway 154 extends through mounting base 130 from second end 150 of collar 146 to opening 144 of face plate 136. First shoulder belt 36 is configured to extend through passageway 154 of mounting base 130.

A plurality of inclined ribs 156 are attached to the exterior surface of side wall 152 of collar 146 and extend from interior face 138 of face plate 136 to second end 150 of collar 146. Ribs 156 are inclined or sloped downwardly from face plate 136 toward second end 150 of collar 146. Collar 146 also includes a plurality of retainer members 158 attached to the exterior surface of side wall 152 and that are located adjacent second end 150 of collar 146. Retainer members 158 are generally wedge-shaped and include an abutment surface 160 that extends outwardly from and generally perpendicular to side wall 152, and a ramped top surface 162 that slopes downwardly from the top end of abutment surface 160 to second end 150 of collar 146. A mount 166 is attached to interior face 138 of face plate 136. Mount 166 includes a generally cylindrical bore 168 that extends from a first end 170 to a second end 172 of mount 166. Bore 168 includes a generally linear central longitudinal axis 174. A stop member 176 is attached to interior face 138 of face plate 136 adjacent first end 170 of mount 166 and in alignment with bore 168 and central axis 174.

Figure 3:
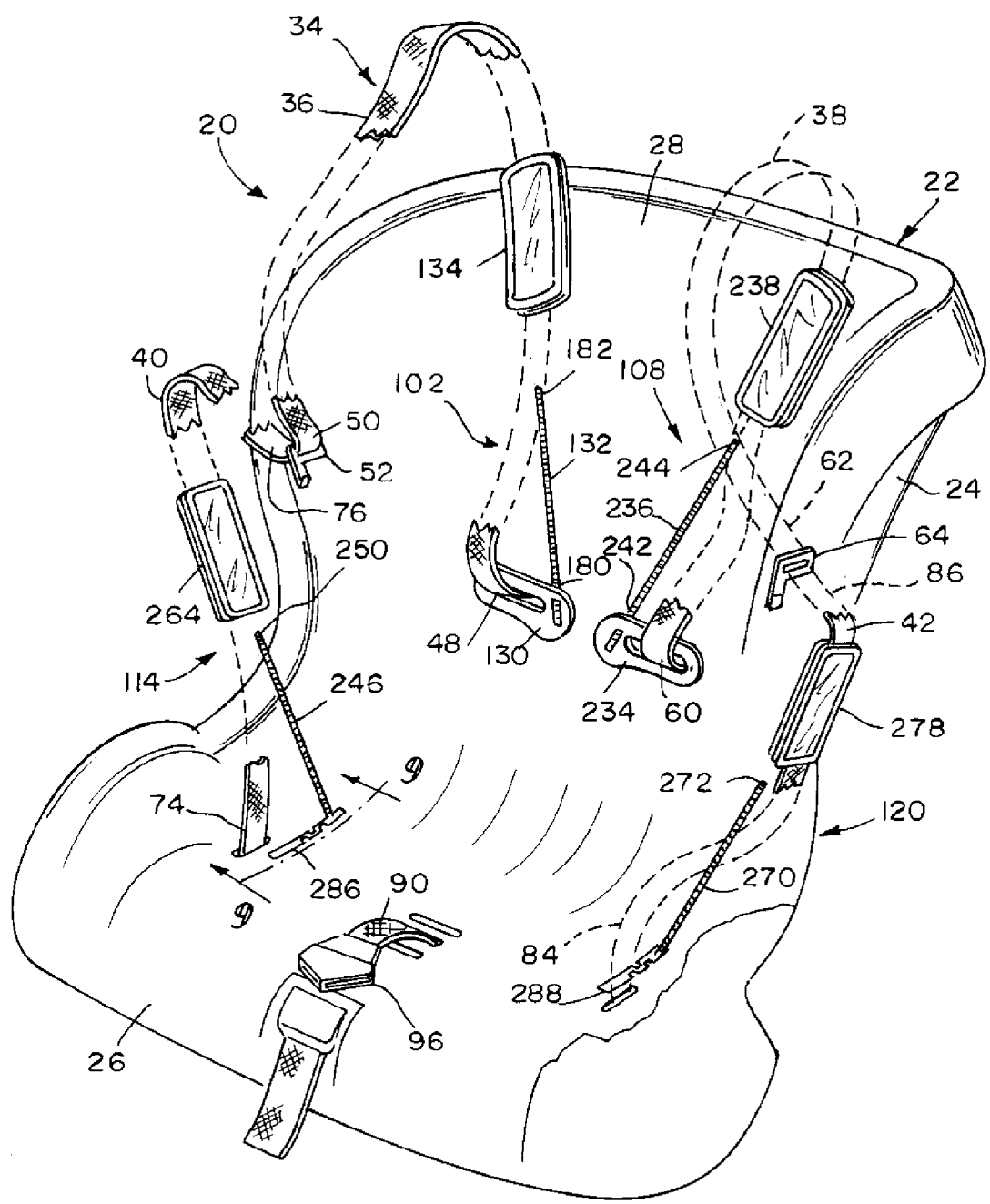
FIG. 3 is a partially exploded perspective view of the child restraint showing the mounting base, biasing member, and coupler pad of the first positioner, the mounting base, biasing member, and coupler pad of the second positioner, the biasing member and coupler pad of the third positioner, and the biasing member and coupler pad of the fourth positioner, with the harness shown in the open juvenile-receiving position.
Figure 15:
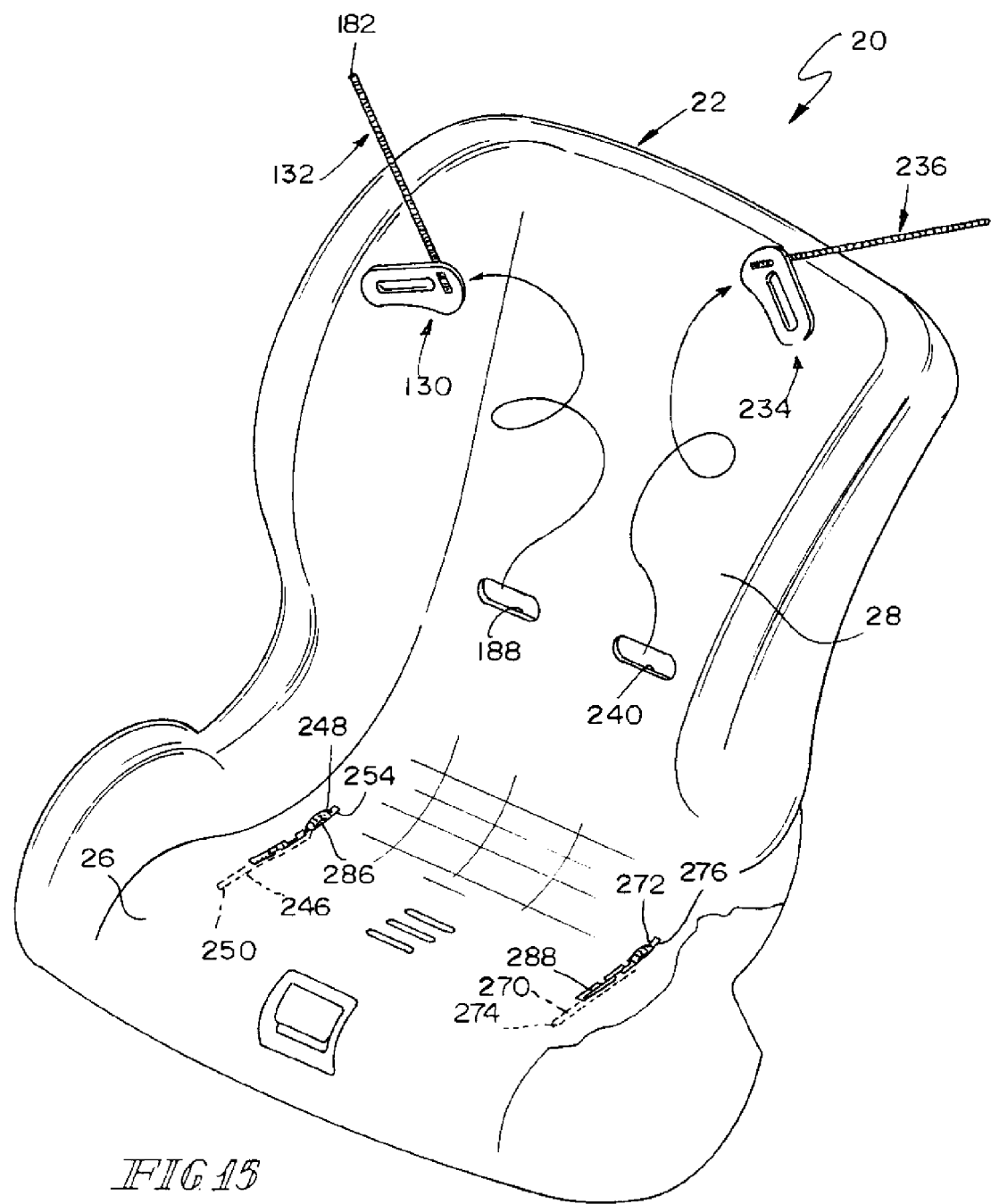
FIG. 15 is a partial exploded view of the child restraint with the coupler pads removed from the biasing members and showing the mounting base and biasing member of the first positioner removed from the juvenile vehicle seat, the mounting base and biasing member of the second positioner removed from the juvenile vehicle seat, the biasing member of the third positioner in a stored position in a first storage pocket within the seat bottom of the juvenile vehicle seat, and the biasing member of the fourth positioner shown in a stored position in a second storage pocket within the seat bottom of the juvenile vehicle seat, such that a juvenile may be secured to the juvenile vehicle seat by a vehicle anchor belt of a vehicle and without use of a harness.

Biasing member 132 of first positioner 102 is resiliently flexible and extends between a proximal end 180 and a distal end 182. Biasing member 132 is generally cylindrically-shaped and includes a central longitudinal axis 184. Biasing member 132 may comprise a generally cylindrical coiled spring. Proximal end 180 of biasing member 132 extends through bore 168 in mount 166 of mounting base 130 and is in engagement with stop member 176. An enlarged portion of biasing member 132 at proximal end 180 engages first end 170 of mount 166 and thereby prevents proximal end 180 from being withdrawn from bore 168 of mount 166 in a direction from first end 170 toward second end 172 of mount 166. Stop member 176 is configured to engage proximal end 180 of biasing member 132 to prevent biasing member 132 from being withdrawn from bore 168 of mount 166 in a direction from second end 172 toward first end 170 of mount 166. Mounting base 130 is configured to be removably coupled to seat back 28 of juvenile vehicle seat 22 by inserting collar 146 into a first receptacle 188, as shown in FIG. 15, formed in seat back 28. Retainer members 158 of collar 146 releasably couple mounting base 130 to seat back 28. Biasing member 132 extends outwardly from mounting base 130, outwardly from seat back 28 and outwardly toward a left side of seat back 28 when biasing member 132 is in a un-biased condition as shown in FIG. 3.

Figure 13:
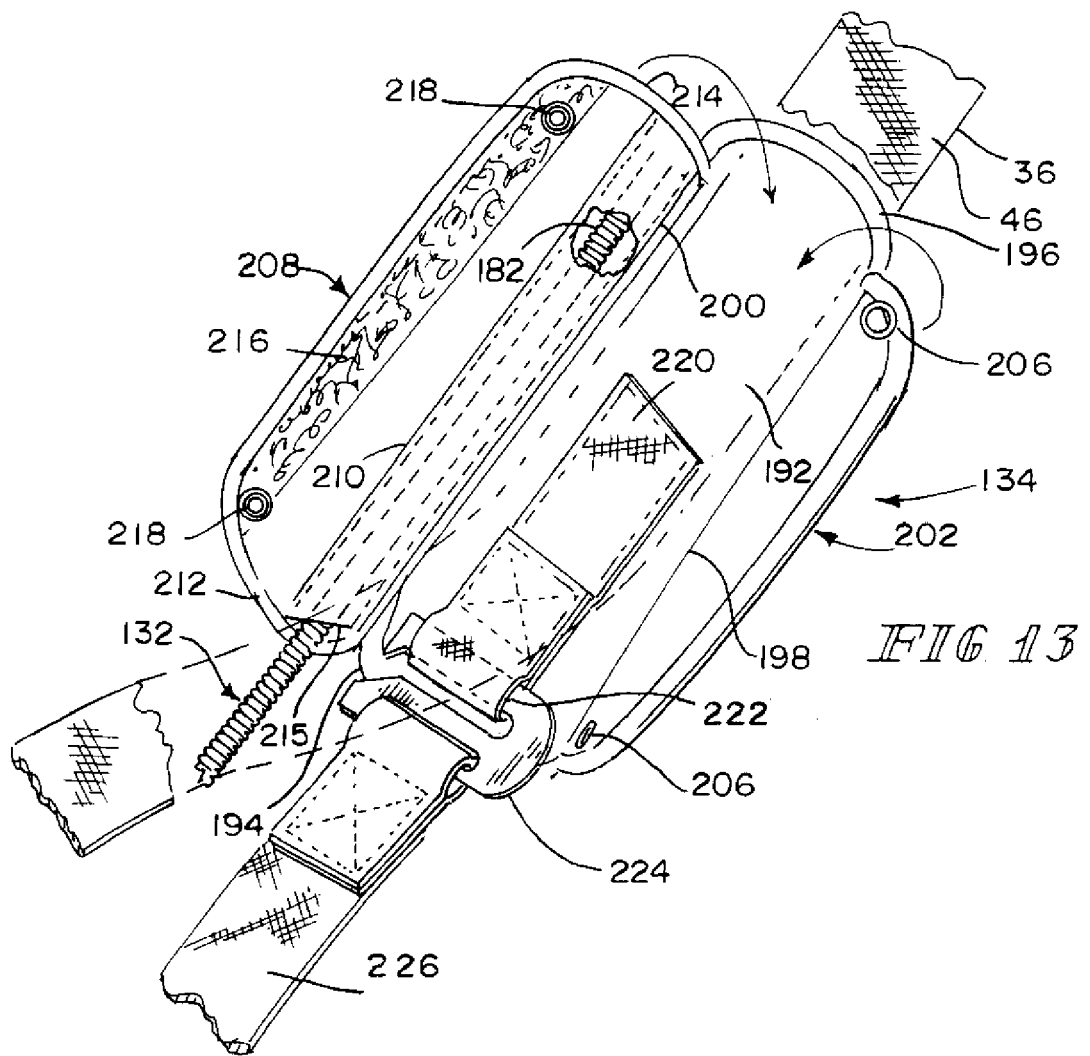
FIG. 13 is an enlarged perspective view of the first positioner showing the base member, cover member, and flap of the first coupler pad in an open position, with the biasing member of the first positioner being received within a sleeve of the cover member, a loop of a retention strap being coupled to the base member and coupled to a loop of the first shoulder belt by a link, and suggesting that the first shoulder belt may be placed along the base member such that the flap and cover member may be folded over the first shoulder belt for coupling to one another such that the first shoulder belt extends through the coupler pad.
Figure 14:
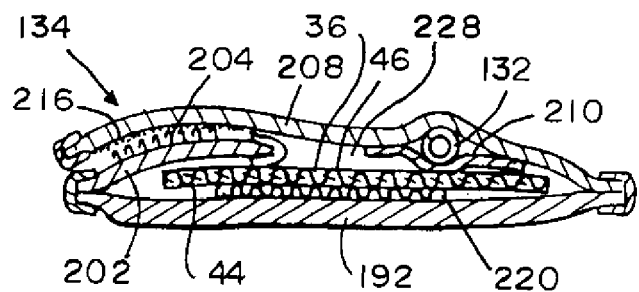
FIG. 14 is a cross sectional view taken along line 14-14 of FIG. 1 showing the coupler pad of the first positioner in the closed position and showing the biasing member within the sleeve of the coupler pad and a belt of the harness extending through a longitudinal passageway of the closed coupler pad.

Coupler pad 134 of first positioner 102, as shown in FIGS. 13 and 14, includes a base member 192 extending from a first end 194 to a second end 196. Base member 192 includes a first side edge 198 and a second side edge 200 that extend from first end 194 to second end 196. A foldable flap 202 is attached to base member 192 along first side edge 198 and extends from first end 194 to second end 196 of base member 192. Flap 202 includes a fastener 204, such a hook member of a hook-and-loop fastener, on the exterior surface of flap 202. The exterior surface of flap 202 may also include a fastener 206 at each end of flap 202. Each fastener 206 may comprise a female member of a snap-fit fastener.

Coupler pad 134 also includes a foldable cover member 208 attached to and extending along second side edge 200 of base member 192. A sleeve 210 is attached to an interior surface of cover member 208 that extends generally parallel to second side edge 200 from a first end 212 to a second end 214 of cover member 208. Sleeve 210 includes an opening 215 at first end 212 of cover member 208 through which distal end 182 of biasing member 132 is inserted such that biasing member 132 is located within sleeve 210 and such that distal end 182 is removably coupled to coupler pad 134. A fastener 216 is attached to the interior surface of cover member 208, such as a loop member of a hook-and-loop fastener. Fastener 216 is adapted to releasably engage fastener 204 of flap 202 as shown in FIG. 14. Interior surface of cover member 208 may also include a fastener 218 at first end 212 and at second end 214 of cover member 208, such as a male member of a snap-fit fastener. Each fastener 218 is configured to removably engage a fastener 206 of flap 202 when coupler pad 134 is in a closed position as shown in FIG. 14.

Coupler pad 134 may, if desired, include a retention strap 220 having a first end attached to an interior surface of base member 192 and a second end including a loop 222. Loop 222 is configured to be removably coupled to a link 224 attached to the end of a strap 226. Strap 226 may be coupled to first shoulder belt 36 or otherwise to juvenile vehicle seat 22. Retention strap 220 is configured to prevent coupler pad 134 from sliding off of biasing member 132.

Coupler pad 134 is coupled to first shoulder belt 36 by placing interior surface 44 of first shoulder belt 36 adjacent the interior surface of base member 192 of coupler pad 134 such that first shoulder belt 36 extends outwardly from first end 194 and second end 196 of base member 192. Flap 202 is then folded over first shoulder belt 36 adjacent exterior surface 46 of first shoulder belt 36. Cover member 208 is then folded over first shoulder belt 36 adjacent exterior surface 46 and over flap 202 such that fastener 216 of cover member 208 removably engages fastener 204 of flap 202 and such that cover member 208 is coupled to flap 202. Fasteners 218 of cover member 208 may then be connected to fasteners 206 of flap 202 to further couple cover member 208 to flap 202 such that coupler pad 134 is in a closed condition as shown in FIG. 14. A belt passageway 228 extends through coupler pad 134 from first end 194 to second end 196 of base member 192 when coupler pad 134 is in the closed condition. First shoulder belt 36 extends through belt passageway 228. First shoulder belt 36 is longitudinally slideable with respect to coupler pad 134 within belt passageway 228. Coupler pad 134 is thereby removably coupled to first shoulder belt 36.

Second positioner 108 of harness-positioning system 100 includes a mounting base 234, a resiliently flexible biasing member 236 and a flexible coupler pad 238. Mounting base 234 is constructed substantially in the same manner as mounting base 130 of first positioner 102 except that mounting base 234 is opposite hand to mounting base 130. Biasing member 236 of second positioner 108 is constructed in substantially the same manner as biasing member 132 of first positioner 102. Coupler pad 238 of second positioner 108 is constructed in substantially the same manner as coupler pad 134 of first positioner 102, except that coupler pad 238 is opposite hand to coupler pad 134. Mounting base 234 of second positioner 108 is configured to be inserted in a second receptacle 240 of seat back 28 such that the proximal end 110 of second positioner 108 is removably coupled to seat back 28. Biasing member 236 extends upwardly from mounting base 234, outwardly from seat back 28, and outwardly toward the right side of juvenile vehicle seat 22 as biasing member 236 extends from its proximal end 242 to its distal end 244. Mounting base 234 couples proximal end 242 of biasing member 236 to seat base 28. Coupler pad 238 couples distal end 242 of biasing member 236 to second shoulder belt 38. Coupler pad 238 may also be removably coupled to juvenile vehicle seat 22 with a retention strap to retain coupler pad 238 in engagement with biasing member 236.

Third positioner 114 of harness-positioning system 100, as shown in FIGS. 9 and 10, includes a resiliently flexible biasing member 246 having a proximal end 248 and a distal end 250. Biasing member 246 is generally cylindrical and includes a central longitudinal axis 252. Biasing member 246 may be a generally cylindrical coiled spring, and may be constructed in substantially the same manner as biasing member 132 of first positioner 102. Proximal end 248 of biasing member 246 is coupled to seat bottom 26 of juvenile vehicle seat 22 by a mounting member 254. Mounting member 254 includes a mount 256 attached to seat bottom 26 having a bore 258. Proximal end 248 of biasing member 246 extends through bore 258. Mounting member 254 also includes a stop member 260 spaced apart from mount 256 in alignment with the central axis of bore 258. Stop member 260 prevents biasing member 246 from being withdrawn through bore 258 of mount 256 in a direction toward stop member 260. An enlarged portion at proximal end 248 of biasing member 246 prevents biasing member 246 from being withdrawn through bore 258 of mount 256 in a direction away from stop member 260. Coupler pad 264 of third positioner 114 may be constructed in substantially the same manner as coupler pad 134 of first positioner 102, except that the opening to the sleeve in coupler pad 264 is located at the opposite end of coupler pad 264 from that as shown in connection with coupler pad 134. In addition, coupler pad 238, if desired, may not include a retention strap and may have an overall size that is smaller than coupler pad 134. Coupler pad 264 is removably coupled to distal end 250 of biasing member 246 and is removably coupled to first lap belt 40 of harness 34.

Fourth positioner 120 of harness-positioning system 100 includes a resiliently flexible biasing member 270 having a proximal end 272 and a distal end 274. Biasing member 270 is constructed in substantially the same manner as biasing member 246 of third positioner 114, and may comprise a cylindrical coiled spring. Proximal end 272 of biasing member 270 is coupled to seat bottom 26 of juvenile vehicle seat 22 by a mounting member 276 that is constructed and operates in the same manner as mounting member 254. Fourth positioner 120 also includes a coupler pad 278 that is constructed in substantially the same manner as coupler pad 264 of third positioner 114, other than that coupler pad 278 is opposite hand to coupler pad 264. Coupler pad 278 is removably coupled to distal end 274 of biasing member 270 and is removably coupled to second lap belt 42 of harness 34.

Figure 4:
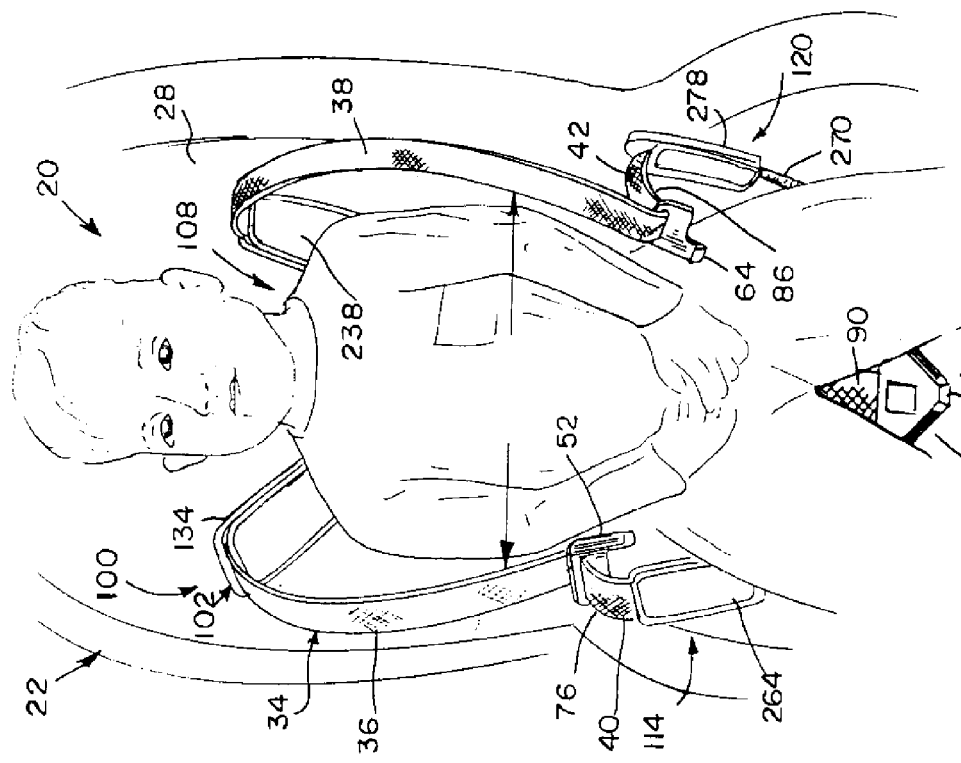
FIG. 4 is a partial front view of the child restraint showing each of the four positioners of the harness-positioning system positioning the shoulder belts and the lap belts of the harness in the open juvenile-receiving position for receipt of a juvenile in the juvenile vehicle seat.

Harness 34 is in an unlocked condition when first buckle 52 and second buckle 64 are released from buckle lock 96. When harness 34 is in an unlocked condition, first positioner 102, second positioner 108, third positioner 114 and fourth positioner 120 move harness 34 to a splayed apart open juvenile-receiving position as shown in FIG. 4. Biasing member 132 of first positioner 102 moves coupler pad 134 and first shoulder belt 36 upwardly and outwardly to the left of seat back 28 and biasing member 236 of second positioner 108 moves coupler pad 238 and second shoulder belt 38 upwardly and to the right of seat back 28. Biasing member 246 of third positioner 114 moves coupler pad 264 and first lap belt 40 upwardly and to the left of seat bottom 26 and biasing member 270 of fourth positioner 120 moves coupler pad 278 and second lap belt 42 upwardly and to the right of seat bottom 26. As shown in FIG. 4, first shoulder belt 36 and first lap belt 40 are splayed apart from second shoulder belt 38 and second lap belt 42 by first positioner 102, second positioner 108, third positioner 114 and fourth positioner 120 toward opposite sides of juvenile vehicle seat 22 to enable easy placement of a juvenile in juvenile vehicle seat 22 without any interference from first shoulder belt 36, second shoulder belt 38, first lap belt 40 or second lap belt 42.

Figure 5:
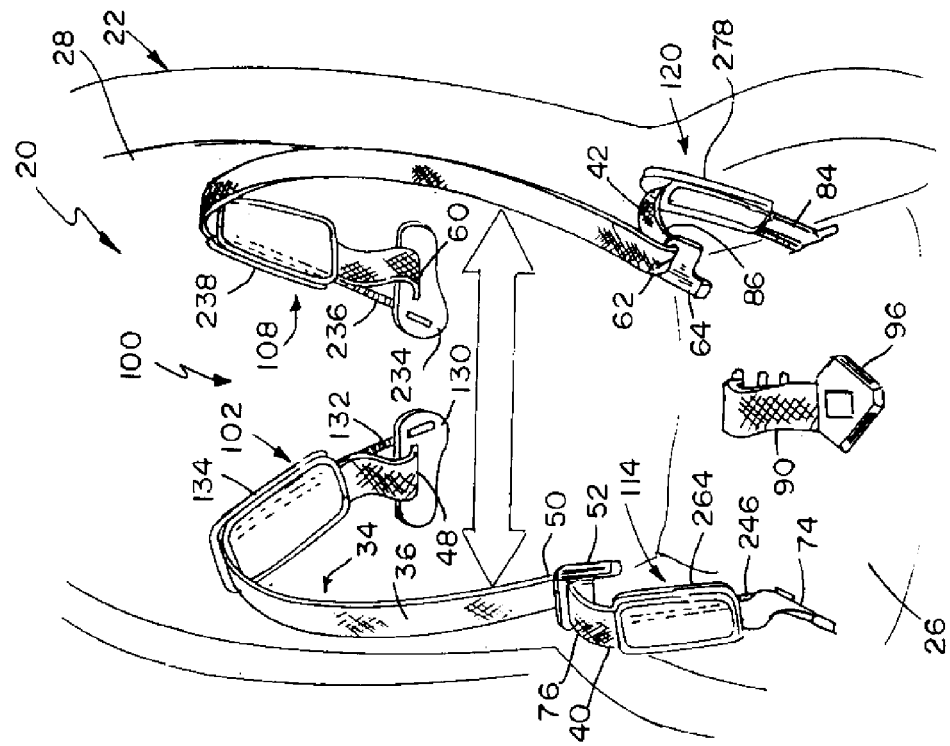
FIG. 5 is a partial front view similar to FIG. 4 showing a juvenile sitting in the juvenile vehicle seat and showing the first and second shoulder belts and the first and second lap belts of the harness positioned in the open juvenile-receiving position by the first positioner, second positioner, third positioner, and fourth positioner of the harness-positioning system, and with the harness configured to be placed in the locked condition to secure the juvenile to the juvenile vehicle seat.
Figure 6:
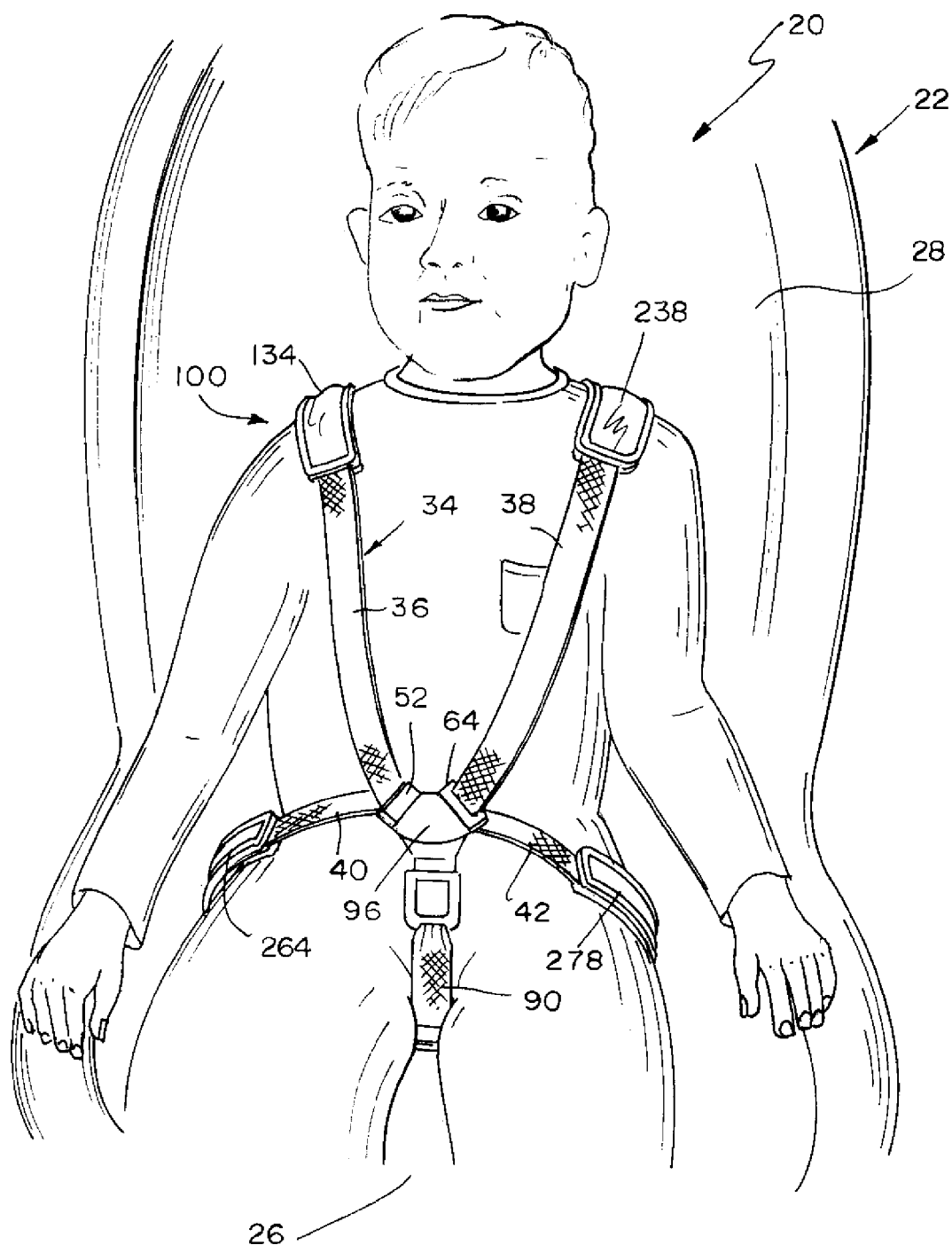
FIG. 6 is partial front view similar to FIG. 5 showing a juvenile sitting in the juvenile vehicle seat with the harness and the harness-positioning system shown in the locked condition and securing the juvenile to the juvenile vehicle seat.

Once the juvenile is placed in juvenile vehicle seat 22 as shown in FIG. 5, first shoulder belt 36 and coupler pad 134 may be placed over the right shoulder of the juvenile by bending biasing member 132 and coupler pad 134 around the juvenile, and first lap belt 40 and coupler pad 264 may be placed over the right hip of the juvenile by bending biasing member 246 and coupler pad 264 around the juvenile, such that first buckle 52 may be coupled to buckle lock 96 of crotch strap 90 as shown in FIG. 6. Second shoulder belt 38 and coupler pad 238 may be placed over the left shoulder of the juvenile by bending biasing member 236 and coupler pad 238 around the juvenile, and second lap belt 42 and coupler pad 278 may be placed over the left hip of the juvenile by bending biasing member 270 and coupler pad 278 around the juvenile, such that second buckle 64 may be coupled to buckle lock 96 of crotch strap 90. Harness 34 is thereby placed in a locked condition as shown in FIG. 6 and securely retains the juvenile in juvenile vehicle seat 22.

When it is desired to remove the juvenile from juvenile vehicle seat 22, first buckle 52 and second buckle 64 are released from buckle lock 96 of crotch strap 90. Biasing member 132 moves toward its unbiased position thereby moving first shoulder belt 36 and coupler pad 134 toward the open juvenile-receiving position. Biasing member 236 of second positioner 108 similarly moves toward its unbiased position and moves second shoulder belt 38 and coupler pad 238 toward the open juvenile-receiving position. Biasing member 246 of third positioner 114 moves toward its unbiased position and moves first lap belt 40 and coupler pad 264 toward the open juvenile-receiving position. Biasing member 270 of fourth positioner 120 moves toward its unbiased position and moves second lap belt 42 and coupler pad 278 toward the open juvenile-receiving position. When harness 34 is in the open juvenile-receiving position, the juvenile may be easily removed from juvenile vehicle seat 22 without interference from harness 34.

Child restraint 20 may be changed or converted from a harness-restraining condition as shown in FIGS. 4-6, wherein harness 34 is used to secure the juvenile to juvenile vehicle seat 22, to a vehicle seat belt-restraining condition wherein the juvenile is retained in juvenile vehicle seat 22 by a vehicle seat belt of a vehicle. As shown in FIG. 15, the harness 34 including first shoulder belt 36, second shoulder belt 38, first lap belt 40, second lap belt 42 and crotch strap 90 are removed from juvenile vehicle seat 22. First shoulder belt 36 and coupler pad 134 may be removed from biasing member 132. Second shoulder belt 38 and coupler pad 238 may be removed from biasing member 236. Biasing member 132 and mounting base 130 of first positioner 102 are removed from seat back 28 and biasing member 236 and mounting base 234 of second positioner 108 are removed from second receptacle 240 of seat back 28. First lap belt 40 and coupler pad 264 are removed from biasing member 246 of third positioner 114. Second lap belt 42 and coupler pad 278 are removed from biasing member 270 of fourth positioner 120. Biasing member 246 of third positioner 114 is bent and stored within a first storage pocket 286 located in seat bottom 26 of juvenile vehicle seat 22, and biasing member 270 of fourth positioner 120 is bent and stored within a second storage pocket 288 located in seat bottom 26 of juvenile vehicle seat 22.

First storage pocket 286, as shown in FIGS. 9 and 10, is generally linear and extends from a proximal end 290 located adjacent mounting member 254 and proximal end 248 of biasing member 246 to a distal end 292. First storage pocket 286 includes a top opening 294 formed in seat bottom 296 that extends from proximal end 290 to distal end 292. First storage pocket 286 also includes an end opening 296 at distal end 292 forming a passageway through seat bottom 26. First storage pocket 286 includes a bottom wall 298 and one or more detent members 300 extending inwardly from top opening 294 and spaced above bottom wall 298. Detent members 300 may be alternately spaced on opposite sides of top opening 294 along the length of top opening 294. FIGS. 9 and 10 show biasing member 246 in an un-stored and un-biased position ready to receive coupler pad 264 in the open juvenile-receiving position.

Figure 11:
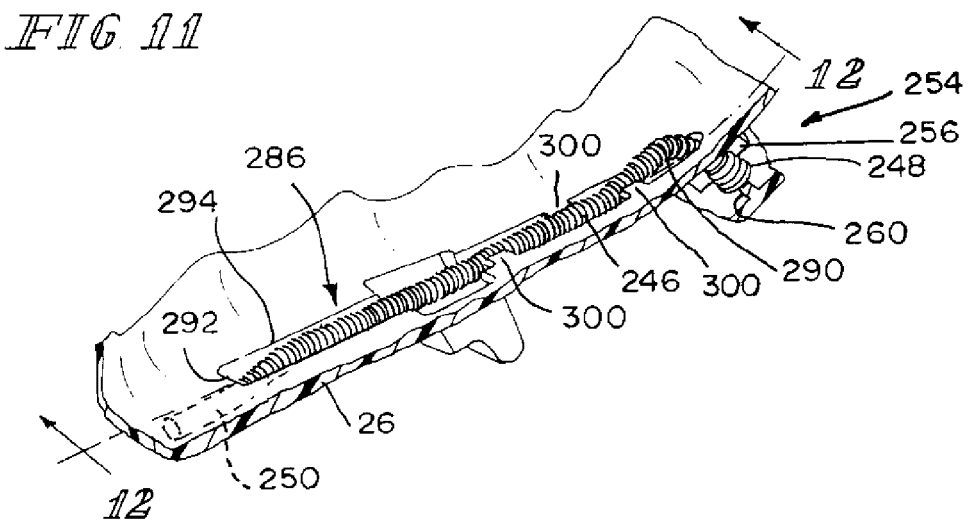
FIG. 11 is a partial perspective view of the seat bottom similar to FIG. 9 showing the biasing member of the third positioner in a stored position within the storage pocket in the seat bottom and with the distal end of the biasing member extending through an aperture in the distal end of the storage pocket.
Figure 12:
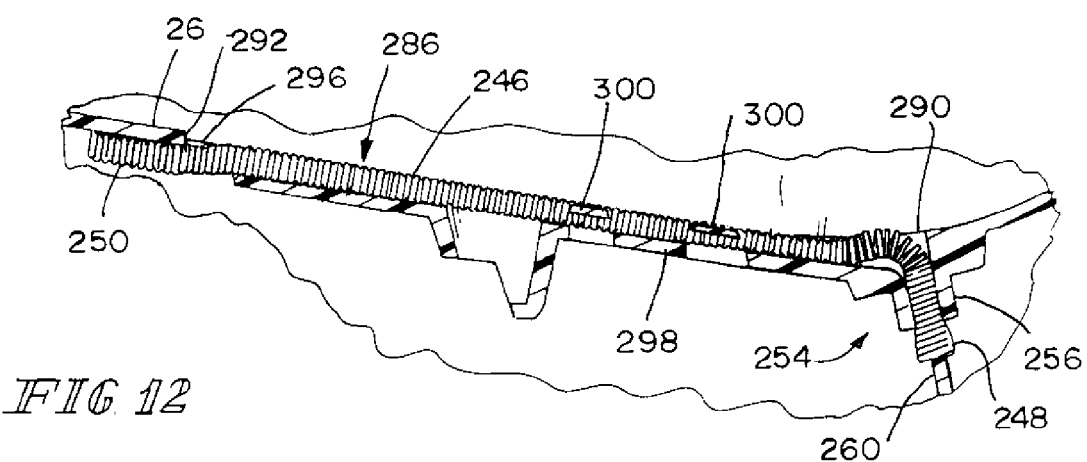
FIG. 12 is a partial cross sectional view of the seat bottom of the juvenile vehicle seat taken along line 12-12 of FIG. 11 showing the biasing member of the third positioner in the stored position within a storage pocket of the seat bottom, with the distal end of the biasing member extending through an aperture in the distal end of the storage pocket and the proximal end of the biasing member coupled to a mount.

Biasing member 246 is shown in FIGS. 11 and 12 in the stored position in first storage pocket 286 with the body of biasing member 246 extending along bottom wall 298 of first storage pocket 286 and distal end 250 of biasing member 246 extending through end opening 296 at distal end 292 of first storage pocket 286. Detent members 300 retain biasing member 246 within first storage pocket 286 in seat bottom 26 such that biasing member 246 does not interfere with the juvenile when the juvenile is in juvenile vehicle seat 22 and when juvenile vehicle seat 22 is in the vehicle seat belt-restraining condition.

Second storage pocket 288 in seat bottom 26 is constructed and functions in the same manner as first storage pocket 286. Biasing member 270 of fourth positioner 120 is placed in second storage pocket 288 in the same manner as biasing member 246 is placed within first storage pocket 286 when juvenile vehicle seat 22 is placed in the vehicle seat belt-restraining condition such that biasing member 270 does not interfere with the juvenile. Child restraint 20 may be changed from the vehicle seat belt-restraining condition to the harness-restraining condition in a reverse manner.

Figure 16:
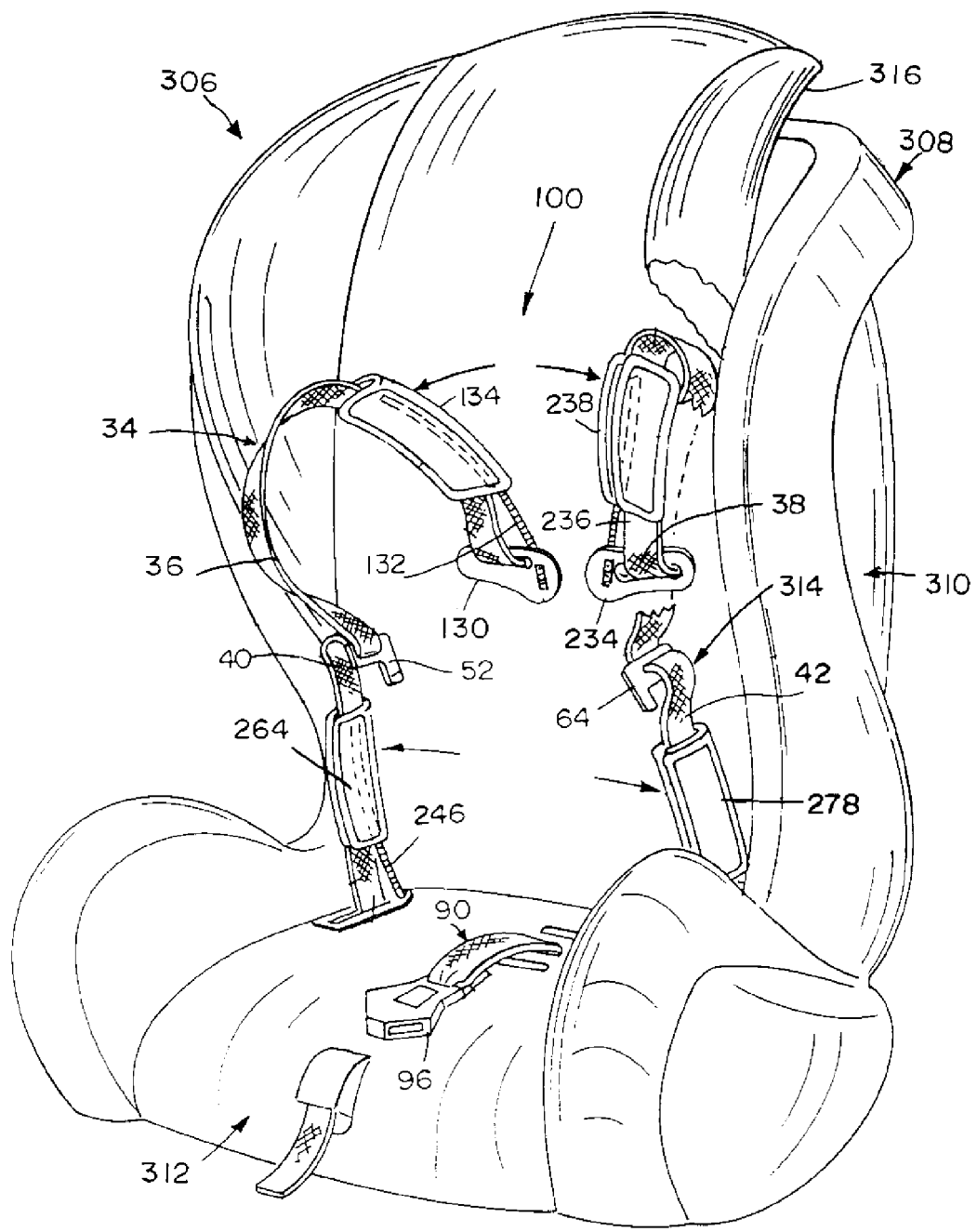
FIG. 16 is a perspective view of an alternate embodiment of the child restraint in accordance with the present disclosure, the child restraint comprises a juvenile vehicle seat including a seat shell and a headrest coupled to the seat shell, a harness shown in an unlocked condition and in an open juvenile-receiving position for securing a juvenile to the juvenile vehicle seat when the harness is placed in a locked condition, the harness including two shoulder belts coupled to the headrest and two lap belts coupled to the seat shell, and a harness-positioning system comprising four positioners for positioning the harness in the open juvenile-receiving position for the receipt of a juvenile in the juvenile vehicle seat when the harness is in the unlocked condition.

An alternate embodiment of the child restraint of the present disclosure is shown in FIG. 16 and is designated with reference number 306. Child restraint 306 includes a juvenile vehicle seat 308 having a seat shell 310, a seat bottom 312 and a seat back 314 extending upwardly from seat bottom 312. Seat back 314 includes an upwardly and downwardly moveable headrest 316.

Child restraint 306 includes harness 34 and harness-positioning system 100 as included in child restraint 20 coupled to juvenile vehicle seat 308. In child restraint 306 the proximal ends 48 and 60 of first shoulder belt 36 and second shoulder belt 38 and the proximal ends 104 and 110 of first positioner 102 and second positioner 108 are coupled to headrest 316 of seat back 314. Mounting base 130 of first positioner 102 is removably coupled to a first receptacle in headrest 316 and mounting base 234 of second positioner 108 is removably coupled to a second receptacle in headrest 316. Proximal ends 48 and 60 of first shoulder belt 36 and second shoulder belt 38, and first and second positioners 102 and 108, are selectively moveable upwardly and downwardly with respect to seat bottom 312 along with headrest 316 to accommodate juveniles of different heights placed in juvenile vehicle seat 308. The construction and function of the harness-positioning system 100 and harness 34 are otherwise the same in child restraint 306 as in child restraint 20.

The invention claimed is:

1. A child restraint adapted to receive a juvenile, the child restraint comprising
    a juvenile vehicle seat having a seat bottom and a seat back extending upwardly from the seat bottom, the seat bottom including a first storage pocket and a second storage pocket,
    a harness adapted to secure a juvenile to the juvenile vehicle seat, the harness including a first shoulder belt having a proximal end associated with the seat back of the juvenile vehicle seat, a second shoulder belt having a proximal end associated with the seat back of the juvenile vehicle seat, a first lap belt having a proximal end associated with the seat bottom of the juvenile vehicle seat, and a second lap belt having a proximal end associated with the seat bottom of the juvenile vehicle seat, and
    a harness-positioning system including a first positioner having a first biasing member, the first biasing member having a proximal end removably coupled to the juvenile vehicle seat and a distal end coupled to the first shoulder belt, a second positioner including a second biasing member, the second biasing member having a proximal end removably coupled to the juvenile vehicle seat and a distal end coupled to the second shoulder belt, a third positioner including a third biasing member, the third biasing member having a proximal end coupled to the juvenile vehicle seat and a distal end removably coupled to the first lap belt, and a fourth positioner including a fourth biasing member, the fourth biasing member having a proximal end coupled to the juvenile vehicle seat and a distal end removably coupled to the second lap belt,
    wherein the harness and the first and second biasing members are removable from the juvenile vehicle seat, the third biasing member is positionable within the first storage pocket in a stored position, and the fourth biasing member is positionable within the second storage pocket.

2. The child restraint of claim 1, wherein each of the proximal ends of the first and second biasing members are removably coupled to the seat back of the juvenile vehicle seat.

3. The child restraint of claim 1, wherein the juvenile vehicle seat includes a headrest coupled to the seat back of the juvenile vehicle seat and each of the proximal ends of the first and second biasing members are removably coupled to the headrest.

4. A method of converting a child restraint from a harness-restraining condition to a vehicle seat belt-restraining condition, wherein the child restraint comprises a juvenile vehicle seat having a seat bottom and a seat back extending upwardly from the seat bottom, the seat bottom including a first storage pocket and a second storage pocket, a harness including a first shoulder belt, a second shoulder belt, a first lap belt, and a second lap belt, and a harness-positioning system including a first biasing member having a proximal end coupled to the juvenile vehicle seat and a distal end coupled to the first shoulder belt, a second biasing member having a proximal end coupled to the juvenile vehicle seat and a distal end coupled to the second shoulder belt, a third biasing member having a proximal end coupled to the juvenile vehicle seat and a distal end coupled to the first lap belt, and a fourth biasing member having a proximal end coupled to the juvenile vehicle seat and a distal end coupled to the second lap belt, the method comprising the steps of
    removing the first biasing member from the juvenile vehicle seat,
    removing the second biasing member from the juvenile vehicle seat,
    removing the first lap belt from the third biasing member,
    removing the second lap belt from the fourth biasing member,
    storing the third biasing member in the first storage pocket, and
    storing the fourth biasing member in the second storage pocket.

* * * * *